United States Patent
Hocquette et al.

(10) Patent No.: US 10,387,823 B2
(45) Date of Patent: Aug. 20, 2019

(54) AUTOMATED PARTITIONING OF TRANSPORTATION ROUTING PROBLEMS

(71) Applicant: International Business Machines Corporation, Armonk, NY (US)

(72) Inventors: Amelie Hocquette, Grasse (FR); Viu-Long Kong, Paris (FR); Stephane Michel, Roquetort les Pins (FR)

(73) Assignee: International Business Machines Corporation, Armonk, NY (US)

( * ) Notice: Subject to any disclaimer, the term of this patent is extended or adjusted under 35 U.S.C. 154(b) by 1191 days.

(21) Appl. No.: 13/709,517

(22) Filed: Dec. 10, 2012

(65) Prior Publication Data

US 2013/0151435 A1 Jun. 13, 2013

(30) Foreign Application Priority Data

Dec. 13, 2011 (EP) .................................. 11306645

(51) Int. Cl.
*G06Q 10/08* (2012.01)

(52) U.S. Cl.
CPC ..... *G06Q 10/08355* (2013.01); *G06Q 10/083* (2013.01)

(58) Field of Classification Search
CPC .............................................. G06Q 10/08355
See application file for complete search history.

(56) References Cited

U.S. PATENT DOCUMENTS

| | | | | |
|---|---|---|---|---|
| 5,170,352 A | * | 12/1992 | McTamaney et al. | 701/26 |
| 5,880,958 A | * | 3/1999 | Helms et al. | 701/117 |
| 7,076,409 B2 | * | 7/2006 | Agrawala et al. | 703/2 |
| 7,281,057 B2 | * | 10/2007 | Cain | 709/238 |
| 7,827,051 B2 | | 11/2010 | Sanchez et al. | |
| 7,840,319 B2 | * | 11/2010 | Zhong | 701/25 |
| 7,983,942 B2 | | 7/2011 | Malitski et al. | |
| 8,630,958 B2 | * | 1/2014 | Carlsson et al. | 705/338 |
| 2003/0078802 A1 | * | 4/2003 | Yonezawa | 705/1 |
| 2005/0246192 A1 | | 11/2005 | Jauffred et al. | |

(Continued)

OTHER PUBLICATIONS

Bell, John E., and Griffis, Stanley E., "Swarm Intelligence: Application of the Ant Colony Optimization Algorithm to Logistics-Oriented Vehicle Routing Problems," Journal of Business Logistics, 31, 2, 2010, p. 157.*

(Continued)

*Primary Examiner* — Nathan Erb
(74) *Attorney, Agent, or Firm* — Yee & Associates, P.C.; Will Stock

(57) ABSTRACT

Method and system are provided for automated partitioning of transportation routing problems. The method includes: determining a threshold number of shipments per partition; selecting a geographic center; mapping delivery and/or pickup sites at geographic locations; scanning radially around the geographic center to determine the sparsest or densest region of sites and selecting a starting point in this region; and progressing from the starting point radially around the geographic center aggregating sites into partitions with a maximum of the threshold number of shipments in a partition. The method may include: solving each partitioned instance of a problem to generate one or more optimized routes; and creating a union of all the instances solutions.

15 Claims, 6 Drawing Sheets

(56) References Cited

U.S. PATENT DOCUMENTS

| | | |
|---|---|---|
| 2006/0224423 A1 | 10/2006 | Sun et al. |
| 2007/0050223 A1 | 3/2007 | Malitski |
| 2009/0106124 A1* | 4/2009 | Yang ..................... G06Q 10/08 705/26.1 |
| 2010/0287073 A1* | 11/2010 | Kocis et al. .................... 705/28 |
| 2010/0332273 A1 | 12/2010 | Balasubramanian et al. |
| 2011/0231335 A1 | 9/2011 | Kocis et al. |
| 2012/0303263 A1* | 11/2012 | Alam et al. .................. 701/410 |
| 2012/0310691 A1* | 12/2012 | Carlsson et al. ............. 705/7.13 |
| 2013/0231862 A1* | 9/2013 | Delling et al. ................ 701/527 |
| 2013/0245926 A1* | 9/2013 | Heaps et al. ................. 701/119 |

OTHER PUBLICATIONS

Ceselli, Alberto, Gatto, Michael, Lubbecke, Marco E., Nunkesser, Marc, and Schilling, Heiko, "Optimizing the Cargo Express Service of Swiss Federal Railways," Transportation Science, 42, 4, Nov. 2008, p. 450-465.*

Goodson, Justin Christopher, Solution Methodologies for Vehicle Routing Problems With Stochastic Demand, University of Iowa, Jul. 2010.*

Hetrakul, Pisit, The Development of Efficient Delivery Routes in Extremely Short Product Life-Cycle Environments, University of Missouri-Rolla, 2004.*

Pacheco et al., "Optimizing vehicle routes in a bakery company allowing flexibility in delivery dates," Journal of the Operational Research Society, vol. 63, No. 5, May 2012, 21 pages.

* cited by examiner

AUTOMATED PARTITIONING OF TRANSPORTATION ROUTING PROBLEMS

BACKGROUND

1. Field

This invention relates to the field of transportation routing. In particular, the invention relates to automated partitioning of transportation routing problems.

This disclosure addresses the domain of Operations Research (OR), more precisely vehicle routing and pickup and delivery optimization.

2. Description of Background Art

Optimizing portions of the logistics chain is a common issue in OR, at the source of very big savings in pretty much all the industrial world. In this domain, classical "pickup/delivery problems" involve:

- Number of shipments to realize. A shipment has an origin, a destination, as well as some properties such as its weight/volume, and constraints on pickup and delivery dates.
- Fleet of vehicles. A vehicle has a capacity, a location and various other properties to be taken into consideration.
- Geography. The routes on which vehicles can circulate, as well as various points on the map which represent pick, delivery, parking places, etc.
- Miscellaneous constraints involving the shipments, vehicles and geographic locations are defined by the user.

The goal of a pickup/delivery optimization system is to take as input a pickup/delivery problem, and provide the best possible solution (assignments of vehicles to shipments and dates) under some time constraints. Here, "best" involves the definition of a goal function, which mixes a variety of objectives, such as minimizing the total cost, resource usage, robustness, etc.

Due to its importance, this problem has long been studied and numerous ad-hoc solutions have been provided. Yet, this class of problem is known to be among the most difficult computational problems (NP-complete).

Most of the existing literature focuses on academic versions of the problem. However, solutions are needed that address real-world situations efficiently.

One common practice to tackle this type of problem includes decomposing a large instance of the problem in a subset of smaller instances that are solvable, at least partially, in tractable time. Often, the decomposition is performed manually, the user describing the boundaries of each sub-problem. Others provide decomposition strategies, but these involve different heuristics, suited to exploitation by a genetic algorithm.

Automated decomposition strategies (also called partitioning or clustering methods) often present the drawback that they result in partitions which are not easy for the user to understand. The consequence is that users will have trouble understanding the reasoning and motivations for the proposed solutions, and therefore will tend not to trust them.

Therefore, there is a need in the art to address the aforementioned problem to provide decomposition strategies that are efficient, but also match well the user mental model of their work.

SUMMARY

According to a first aspect of the present invention, there is provided a method for automated partitioning of transportation routing problems including: determining a threshold number of shipments per partition; selecting a geographic centre; mapping delivery and/or pickup sites at geographic locations; scanning radially around the geographic centre to determine the sparsest or densest region of sites and selecting a starting point in this region; and progressing from the starting point radially around the geographic centre aggregating sites into partitions with a maximum of the threshold number of shipments in a partition.

In one embodiment, the method may include: receiving as inputs one or more identifiers of pickup or delivery sites, one or more identifiers of geographic centres, one or more vehicle capacity constraints, and one or more temporal constraints; calculating one or more problem space sizes based on the number of said geographic centres and said one or more vehicle capacity constraints; for each problem space of size greater than a predetermined size: partitioning said one or more problem spaces by said number of said geographic centres; further creating one or more partitions of said problem spaces according to said any temporal constraints; iteratively creating an aggregation of said one or more pickup or delivery sites within each partition of said problem space until said aggregation reaches said predetermined size of said problem space; and selecting said one or more optimised vehicle routes according to said aggregation.

According to a second aspect of the present invention, there is provided a system for automated partitioning of transportation routing problems, including: a processor; a threshold constant component for determining a threshold number of shipments per partition; a centre selection component for selecting a geographic centre; a site mapping component for mapping delivery and/or pickup sites at geographic locations; a radially scanning component for scanning radially around the geographic centre to determine the sparsest or densest region of sites and selecting a starting point in this region; and a site aggregating component for progressing from the starting point radially around the geographic centre aggregating sites into partitions with a maximum of the threshold number of shipments in a partition.

According to a third aspect of the present invention, there is provided a computer program stored on a computer readable medium and loadable into the internal memory of a digital computer, including software code portions, when said program is run on a computer, for performing the method of the first aspect of the present invention.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and a system are described which propose a technique to analyze particularly large instances of pickup/delivery problems, and partition them in a set of smaller problems based on some heuristics. Those heuristics may rely on measures of the topology and geometry of the particular problem instances.

The described solution particularly targets routing with pickup and delivery of shipments, as the characteristics of the heuristics used match well the physical constraints often encountered in the real world.

A method is provided to decompose automatically a large problem instance into smaller instances that can be solved independently from each other. The approach may analyze both the spatial and temporal dimensions, and automatically determine how to split a problem.

Figure 1:
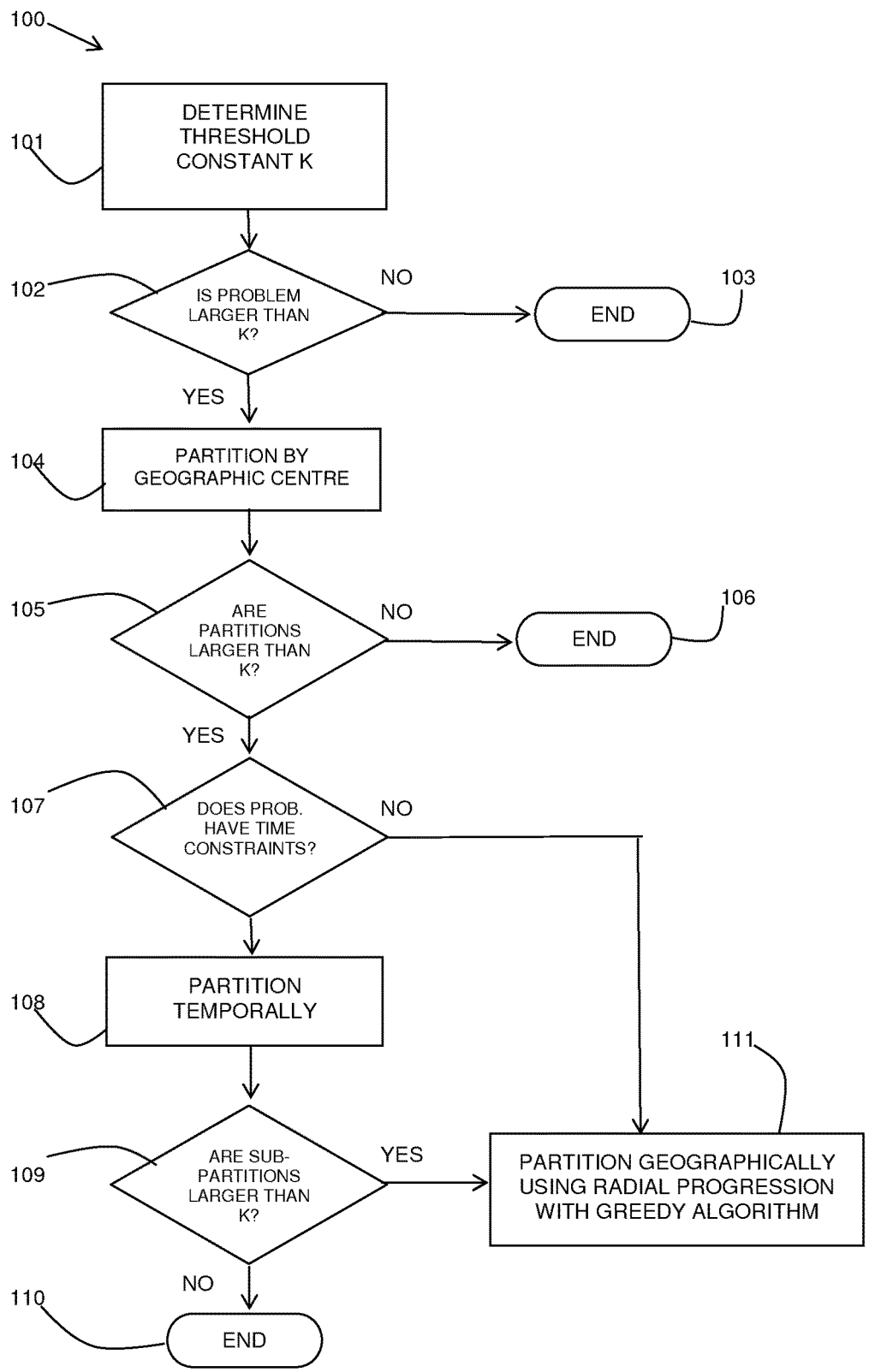
FIG. 1 is a flow diagram of an embodiment of a method in accordance with the present invention.

Referring to FIG. 1, a flow diagram 100 shows an embodiment of the described method of automatic partitioning shipments in a transportation routing problem. A shipment may be a pickup or delivery of goods, people, or any items requiring transportation. A constant K may be determined 101 as a threshold for the size of a partition of shipments in the transportation routing problem. K may be determined by a number of factors of the problem. For example, K may be dependent on the capacity of the for the transportation algorithm. This might be the amount of computational resources resulting in a time to solve a sub-model of size K. Another possibility for choosing K would be that over K shipments, the computer does not have enough memory to hold the problem. In one embodiment, the constant K may be set to 300 following numerous benchmark-based tests.

It may be determined 102 if the problem is larger than a shipment number K. If is it not, the process may end as the transportation problem is not too big to be solved using known techniques. If the problem is larger than K, the problem may be partitioned 104 by geographic centres of the problem. For example, a geographic centre may be a hub or a warehouse for pickups and/or deliveries, or other distinguished location.

It may then be determined 105 if partitioning by geographic centre results in partitions of size of shipments greater than K. If not, the process may end. If one or more partitions involve shipments greater in size than K, it may be determined if the problem has a time constraint (for example, if there is a constraint requiring that all shipments be performed within a given interval). If the problem does have defined time constraints then further partitioning of the problem may be carried out temporally 108. Further details of an example of temporal partitioning is give in relation to FIG. 3. The geographic centre and temporal partitioning 104, 108 methods may take place in the reverse order with temporal partitioning 108 carried out before geographic centre partitioning 104, if the problem requires.

If the problem does not have a time constraint, or the partitions obtained from partitioning temporally 108 are of shipment size greater than K, further partitioning of the problem may be carried out 111 geographically. The geographical partitioning 111 may use a method of radial progression with a greedy algorithm such that no partitions contain more than K shipments.

In addition to this general method, a further improvement may involve dynamically choosing the constant K based on the following heuristic:

given a function T(N), empirically evaluated to be $N^3/C$ (C is a constant), a problem of size N (shipments), it may be decided to partition the problem in M groups of K items such that $T(N) < sum(i=1 \ldots M, T(M_i))$.

The described approach fits well with "natural" ways of partitioning a problem to make it tractable; henceforth, the solutions it provides are easy to understand. This is a very important characteristic to meet to obtain customer satisfaction.

The described method also provides fully automated solutions, avoiding the need for the user to enter their own partitioning.

Figure 2:
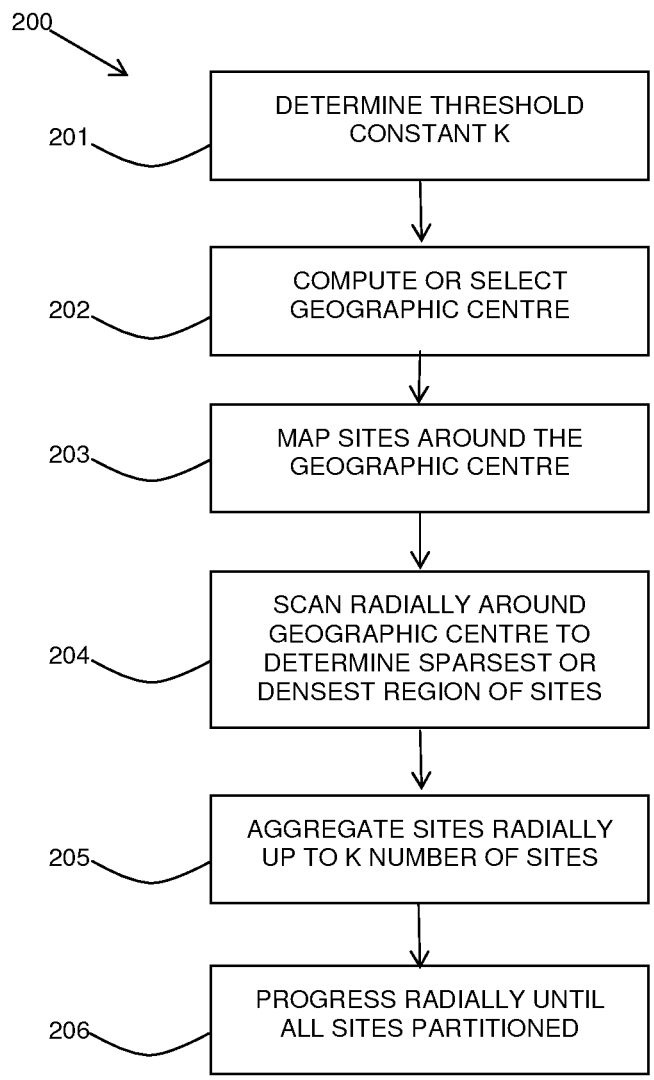
FIG. 2 is a flow diagram of an embodiment of an aspect of a method in accordance with the present invention.

Referring to FIG. 2, a flow diagram 200 shows an embodiment of a method of partitioning shipments geographically as in step 111 of FIG. 1.

The threshold of number of shipments constant K is determined 201 for the desired size of partitions. Alternatively, K may be selected dynamically as described above.

A geographic centre is computed or selected 202 as a location for which shipments are to be partitioned. The geographic centre may be an already existing site (a warehouse, for example, which may or may not be geographically central to the pickup/delivery sites), or it may be computed as a geometric barycentre (in which case this will be central to the pickup/delivery sites). The geographic centre may be a warehouse, hub, any location from which shipments may be picked up and/or delivered, or a location computed geometrically from the existing sites. Shipments may have geographical sites of delivery or pickup which may be mapped 203 in relation to the geographic centre.

To create a partition, the algorithm may scan 204 the geography radially around the geographic centre to find either the sparsest angular region of shipment sites or the densest angular region of shipment sites.

In one embodiment, this may be done by binning or dividing all the sites in K2 bins according to the angle they form between a predetermined (vertical) line and the site's location with respect to the geographic centre and determining the smallest bin or the largest bin in the resulting list.

For example, there may be 10 bins, which means sorting the angle into 10 categories. As the aim is to divide the sites with regards to the angle to the geometric centre, the set of all possible angles will range from 0 to 359 degrees. If divided into 10 bins, each bin will contain the sites in a 36 degree "pie slice".

Bin 1 may contain all sites which angle to the geometric centre is [0 to 35 degrees]. Bin 2 will contain all sites which angle to the geometric centre is [36 degrees to 71 degrees] etc.

The smallest bin will be the group that has the smallest number of sites. If, for example, bin 2 (36 to 71 degrees) contains only 3 sites, this will be the starting point for the scan, as bin 2 will be the angles with the sparsest density of sites.

Useful values for K2 may range from 10 to 360, but a larger value is possible if the number of sites is really very large (more than thousands).

In another embodiment, this may be done by scanning the geography for the densest group of sites, then expanding around the geographic centre to its nearest neighbour until it reaches K elements.

Then the algorithm may scan 205 radially (clockwise or counter clockwise) the region, aggregating all the sites in one partition until it reaches K elements. It progresses 206 by circling around the geographic centre of all the locations and aggregating groups of K elements iteratively. This provides an angular-progression based greedy method.

Figure 3:
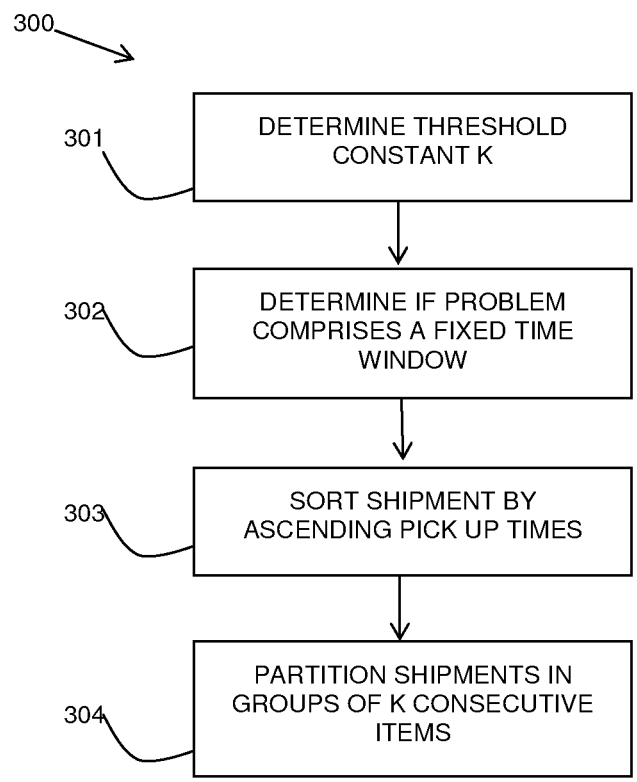
FIG. 3 is a flow diagram of an embodiment of a further aspect of a method in accordance with the present invention.

Referring to FIG. 3, a flow diagram 300 shows an embodiment of a method of partitioning shipments temporally as in step 108 of FIG. 1.

The threshold number of shipments constant K is determined 301 for the desired size of partitions. Alternatively, K may be selected dynamically as described above.

Determine 302 if the problem instance comprises a fixed time window. If so, the problem instance may be decomposed according to the temporal dimension by sorting 303 the shipment by ascending pickup time and partitioning 304 the sub-problem instances in groups of K consecutive items.

Figure 4:
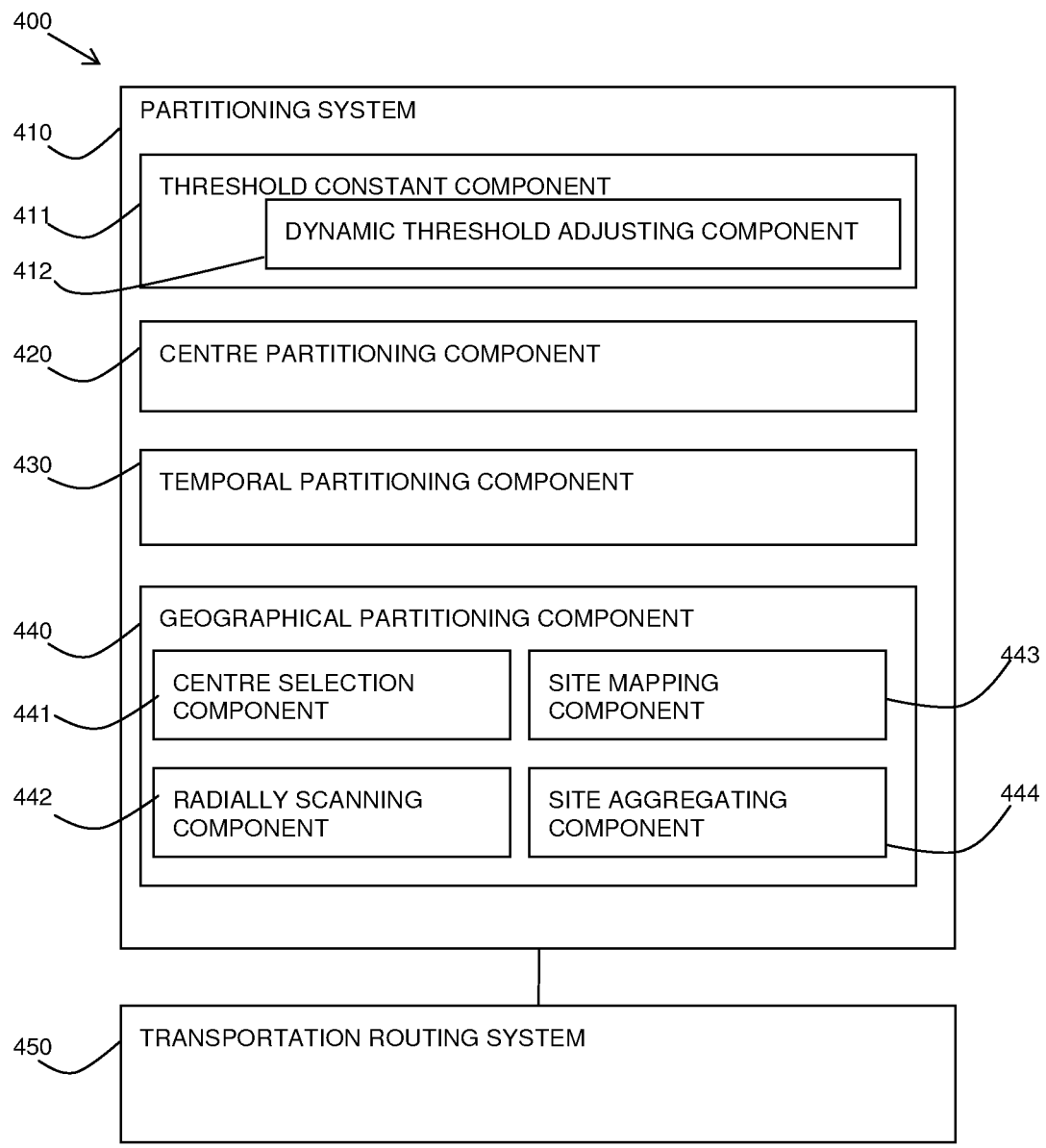
FIG. 4 is a block diagram of an embodiment of a system in accordance with the present invention.

Referring to FIG. 4, a block diagram shows an embodiment of the described system 400. The described partitioning system 410 may be provided as an extension or modification to an existing transportation routing system 450 either integrally or as a separate component. For example, a transport routing system 450 may be a pickup and delivery optimization system such as IBM's Transport Analyst (TA) (IBM is a trade mark of International Business Machines Corporation).

A transportation routing system 450 may have some input data structures which may include: shipments with pickup site, delivery site, time window;
sites with x and y coordinates (or a distance matrix between sites);
vehicles; and
other characteristics required for the expression of side constraints.

The transport routing system 450 produces as output a set of routes. A route may by for example:
Vehicle X:
performs the pickup of shipment Y (loads the shipment Y) at a given time;
performs the delivery of shipment Y (unloads the shipment Y) at a given time;
performs the pickup of shipment Z at a given time;
performs the delivery of shipment Z at a given time;
etc. . . . . .

A route is a tuple (vehicle, list of shipments, list of load and unload events).

A partitioning system 410 is provided which decomposes the input data into a partition of smaller instances of approximately equal, predetermined sizes. All the resultant smaller instances may be solved using known methods of the transportation routing system 450, for example, the optimization engine of IBM ILOG Transportation Analyst software. The partitioning system 410 takes as input a full problem instance and produces as output partitions {m1 . . . mM} of similarly structured problem instances that can be solved independently.

The partitioning system 410 may include a threshold constant component 411 for determining or setting a threshold for the size of the partition of shipments required. This may include a dynamic threshold adjusting component 412 for dynamically adjusting the threshold according to heuristics.

The partitioning system 410 may include a geographical partitioning component 440 for partitioning a shipment around a hub or geographical centre using a radial progression with a greedy algorithm such that no partition contains more than the threshold number of shipments.

The geographical portioning component 440 may include a centre selection component 441 for selecting a geographic centre about which the geographic partition is to be made. It may also include a site mapping component 443 for mapping delivery and pickup sites. A radially scanning component 442 may be provided for radially scanning around the geographic centre to find the sparsest or the densest angular region of shipment sites. A site aggregation component 444 may be provided for aggregating partitions of the threshold number of shipments as the radially scanning component 442 scans around the geographic centre.

The partitioning system 410 may include a centre partitioning component 420 for partitioning a shipment by geographical centres. This component may be used in conjunction with a geographical portioning component 440 in order to divide the shipment into geographic centres before using the radial progression for each geographic centre.

The partitioning system 410 may include a temporal partitioning component 430 for partitioning a shipment by time constraints. This component may be used if there are time constraints in the shipment which may help initially partition the shipment before using the radial progression for each geographic centre.

The transportation routing system 450 or the portioning system 410 may create a union of all the instances solutions. It may also make a local search optimization on the resulting set, for example, using known methods such as those provided by the optimization engine of IBM ILOG Transportation Analyst software. The transportation routing system 450 may also provide the resulting set as a proposed best solution for the problem instance provided as input.

The aim of the decomposition is that instead of solving a large model M, M is split into N smaller, independent models m1 m2 m3 . . . mN. Then for each m, a solution S is found: S1 is the solution for m1; S2 is the solution for m2; etc. To find each solution Si, an algorithm of a transportation routing system 450 may be used. Once all Si are found, the union of all the solutions (S1+S2+S3+ . . . SN) is a solution for M. Yet this may not be the best solution for M. Therefore another local search optimization may be carried out to try to find a better solution for M. If a local search optimization is not carried out at this point, then the union of solutions S would be the best solution found so far (even if this is not the absolute best solution for the problem).

Figure 5:
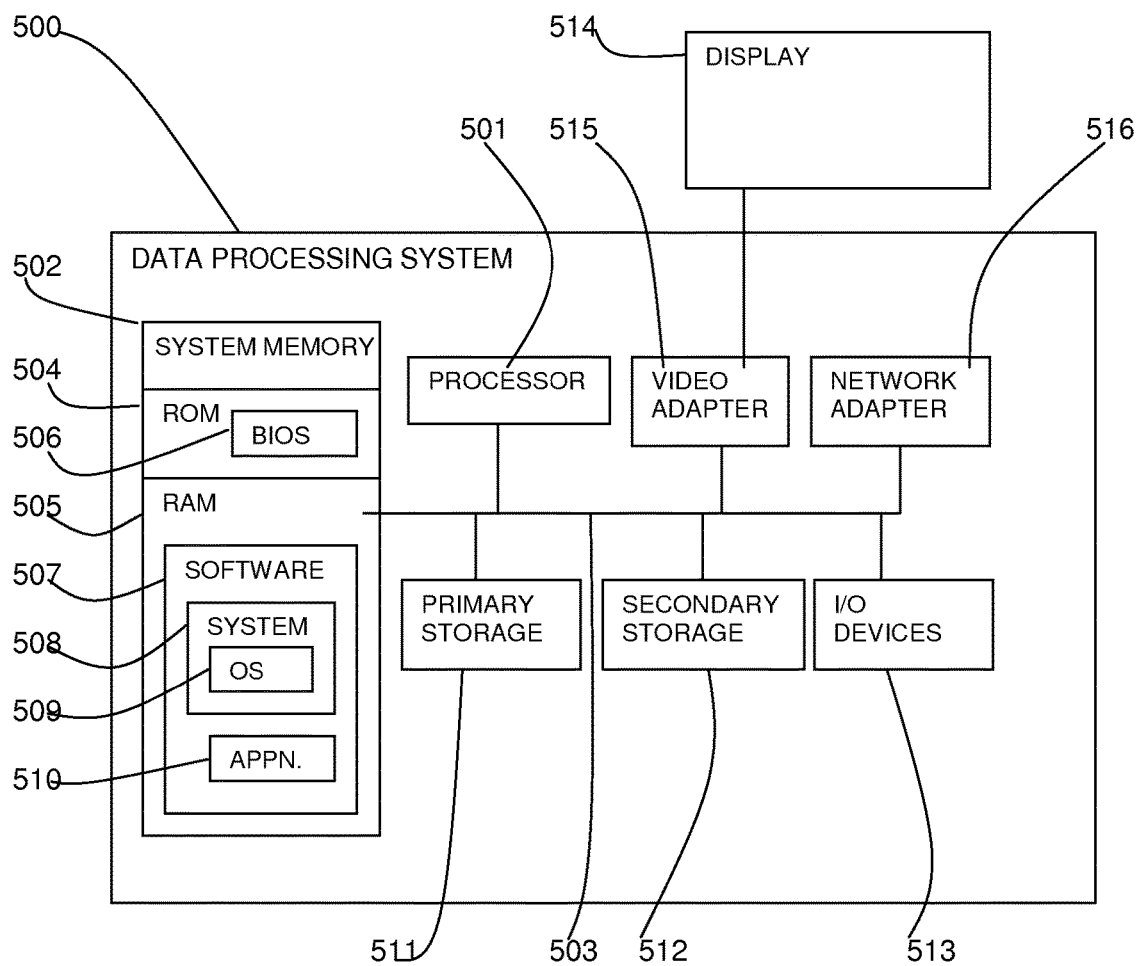
FIG. 5 is a block diagram of a computer system in which the present invention may be implemented.

Referring to FIG. 5, an exemplary system for implementing aspects of the invention includes a data processing system 500 suitable for storing and/or executing program code including at least one processor 501 coupled directly or indirectly to memory elements through a bus system 503. The memory elements can include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505 including operating system software 508. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 can be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

EXAMPLE

Figure 6A:
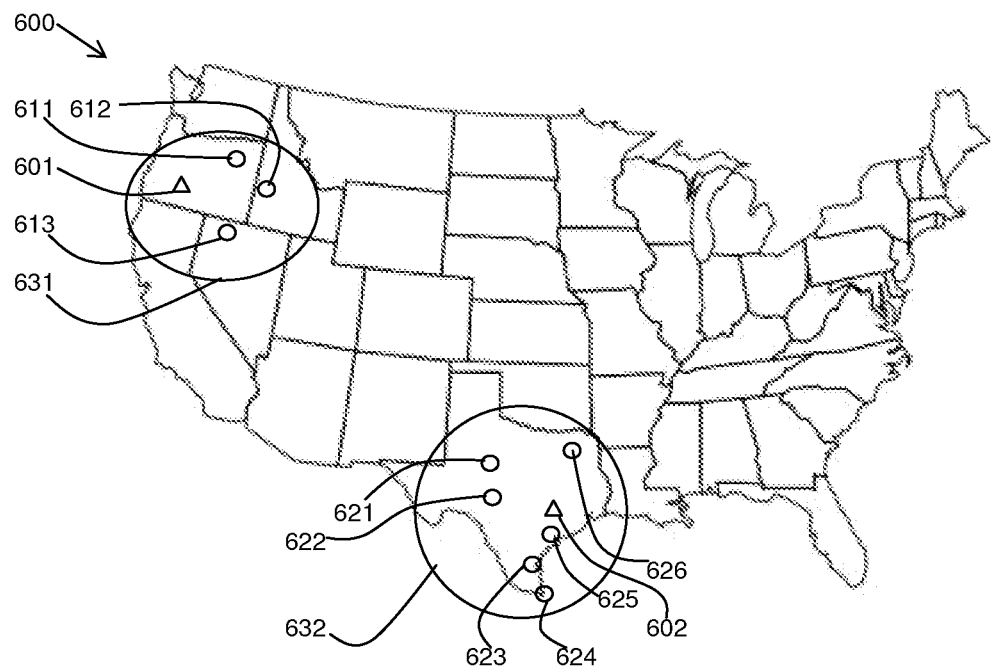
FIGS. 6A and 6B are schematic diagrams illustrating aspects of the present invention.
Figure 6B:
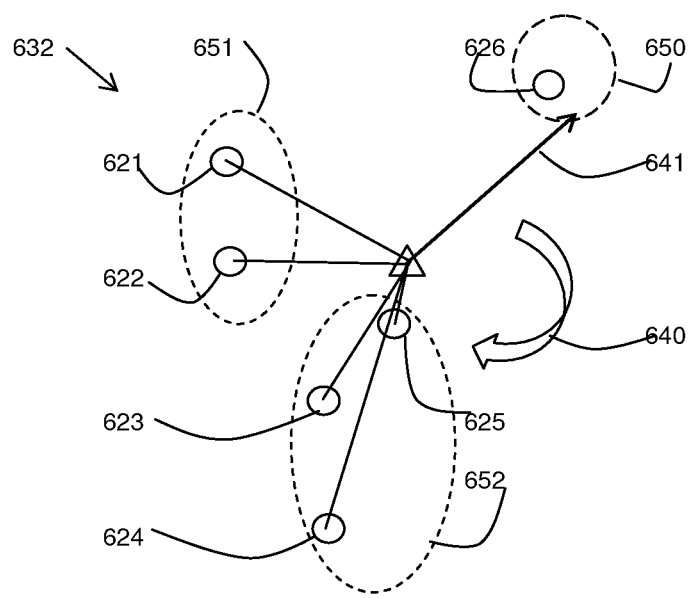

Referring to FIGS. 6A and 6B, an example is provided of a problem with a given vehicle routing with pickup and delivery sites and a time window. A map 600 shows the geographic locations of warehouses and sites.

The model has:

2 warehouses 601, 602 shown as triangles on the map; and 9 shipments {s1, s2, s3, n1, n2, n3, n4, n5, n6} shown on the map 600 as either delivery or pickup sites 611-613, 621-626.

The goal is to decompose this model into k=3 shipments at most. Each sub-model must be independent from the other sub-models.

Decomposition by Warehouse

The automatic decomposition may decompose the model into 2 sets of shipments:

W1={s1, s2, s3} 631 centered around the first warehouse 601; and

W2={n1, n2, n3, n4, n5, n6} 632 centered around the second warehouse 602.

This results in the first sub-model W1 631 has a number of shipments below the threshold and the second sub-model W2 632 has a greater number of shipments than the required threshold.

Time Window Decomposition

Time windows may be sorted and then aggregated.

W1={s1, s2, s3} 631 is not further decomposed in this step;

W2={n1 . . . n6} 632 is decomposed into:

T1={n1} 650 formed of node 626;

T2={n2, n3, n4, n5, n6}, nodes 621-625.

| Shipment ID | Source ID | Destination ID | Delivery earliest start time | Delivery latest end time |
|---|---|---|---|---|
| 1 | 1 | 3 | 22 Jun. 2011 11:30 | 22 Jun. 2011 14:30 |
| 2 | 1 | 4 | 22 Jun. 2011 13:00 | 22 Jun. 2011 15:00 |
| 3 | 1 | 5 | 22 Jun. 2011 14:00 | 22 Jun. 2011 16:00 |
| 4 | 2 | 6 | 22 Jun. 2011 08:00 | 22 Jun. 2011 12:00 |
| 5 | 2 | 7 | 23 Jun. 2011 08:00 | 23 Jun. 2011 12:40 |
| 6 | 2 | 8 | 23 Jun. 2011 09:00 | 23 Jun. 2011 14:00 |
| 7 | 2 | 9 | 23 Jun. 2011 10:00 | 23 Jun. 2011 12:00 |
| 8 | 2 | 10 | 23 Jun. 2011 11:00 | 23 Jun. 2011 16:00 |
| 9 | 2 | 11 | 23 Jun. 2011 12:00 | 23 Jun. 2011 16:00 |

Spatial Decomposition

T2={n2, n3, n4, n5, n6} is decomposed in this step.

One axis 641 with less density is found. Nodes 621-625 are aggregated in clockwise 640 order until maximum number of shipments per model is reached.

Here, T2 is decomposed into:

P1={n2, n4, n6} 652 formed of nodes 623, 624, 625;

P2={n3, n5} 651 formed of nodes 621, 622.

Solving

The resulting partition from the 3 previous steps lead to 4 models:

W1={s1, s2, s3} 631;

T1={n1} 650;

P1={n2, n4, n6} 652;

P2={n3, n5} 651.

Each of these models is a vehicle routing problem that is solved to have solutions $S_{W1}$, $S_{T1}$, $S_{P1}$, $S_{P2}$.

The set S={$S_{W1}$, $S_{T1}$, $S_{P1}$, $S_{P2}$} is a solution for the initial vehicle routing problem with pickup and delivery. This S can be used has an initial solution that is further improved using local search with the optimization engine.

Example Detailed Method

Input:

A set of sites V={$v_1$ . . . $v_k$} is provided. Each site $v_i$ has a pair of coordinates (x,y) defining its position, and a site id $ID_{vi}$.

A model M={$s_1$, . . . $s_N$} shipments. Each shipment $s_i$ has a delivery site $d_i$, a pickup site $p_i$, an optional delivery time window $TW_{di}$ and an optional pickup time window $TW_{pi}$.

A target partition size is MaxSize.

Output:

A partition R={$M_1$ . . . $M_j$} of M, each satisfying the following property:

$M_i$ is a model contained in M and independent from the other models in R.

$M_i$ contains at most MaxSize shipments

```
If k < MaxSize
  Return V
Else
  Let R = { } the result of the partition
  Let R2 = { } the list of models to be further decomposed by time
    Let R1 = HierarchicalDecomposition(V)
    For each w in R1
      If (size of w < MaxSize) {
```

```
            Add w to R
    } else {
            Add w to R2
    }
    Let R3 = { } the list of models to be further decomposed spatially
    For each x in R2
        Let TDA = TimeDecompositionAggregation(x)
        If size of resulting models in TDA is large enough
            For each y in TDA
                If (size of y < MaxSize)
                    Add y to R
                else
                    Add y to R3
        Else
            Let TD = TimeDecomposition(x)
            For each y in TD
                If (size of y < MaxSize)
                    Add y to R
                else
                    Add y to R3
    For each z in R3
        Let SD = RadialDecomposition(z);
        For each u in SD
            Add u to R
    Return R
```

Auxiliary Function 1: Hierarchical (Spatial by Warehouse) Decomposition

Input:

A set of sites $V=\{v_1 \ldots v_k\}$. Each site $v_i$ has a pair of coordinates (x,y) defining its position, and a site id $ID_{vi}$.

A model $M=\{s_1, \ldots s_N\}$ shipments. Each shipment $s_i$ is has a delivery site $d_i$, a pickup site $p_i$, an optional delivery time window $TW_{di}$ and an optional pickup time window $TW_{pi}$.

A target partition size MaxSize.

Output:

A partition $R=\{M_1 \ldots M_j\}$ of M, each satisfying the following property:

$M_i$ is a model contained in M and independent from the other models in R.

$M_i$ contains at most MaxSize shipments

HierarchicalDecomposition(M):

```
    Build a list of couples L1 = (pickup site, shipment list)
    Build a list of couples L2 = (delivery site, shipment list)
    Concatenate L1 and L2 into L.
    Sort L by number of shipment in the shipment list.
    R = { }
    For each (site, shipment list) from L
        Let M = { } a new empty model
        For each shipment H of the shipment list
            If (the shipment has not been processed yet)
                Add H to model M
        Add M to R
    Return R;
```

Auxiliary Function 2: Time Window Decomposition by Aggregation of Overlapping Time Windows

Input:

A set of sites $V=\{v_1 \ldots v_k\}$. Each site $v_i$ has a pair of coordinates (x,y) defining its position, and a site id $ID_{vi}$.

A model $M=\Delta s_1, \ldots s_N\}$ shipments. Each shipment $s_i$ is has a delivery site $d_i$, a pickup site $p_i$, an optional delivery time window $TW_{di}$ and an optional pickup time window $TW_{pi}$.

A target partition size MaxSize.

Output:

A partition $R=\{M_1 \ldots M_j\}$ of M, each satisfying the following property:

$M_i$ is a model contained in M and independent from the other models in R.

$M_i$ contains at most MaxSize shipments

TimeDecompositionAggregation(M):

```
    If (no time window)
        Return M;
    Build L = (shipment, time window) from M
    Sort L by start time window
    CurrentTW = time window of L[0]
    CurrentM = { } an empty model
    R = { } the resulting decomposition
    For each (shipment s, time window tw) in L
        If (tw intersects currentTW)
            Add s to currentM
            Merge time windows currentTW and tw
        Else
            Add currentM to R
            currentM = { }
    return R;
```

Auxiliary Function 3: Time Window Decomposition

Input:

A set of sites $V=\{v_1 \ldots v_k\}$. Each site $v_i$ has a pair of coordinates (x,y) defining its position, and a site id $ID_{vi}$.

A model $M=\{s_1, \ldots s_N\}$ shipments. Each shipment $s_i$ is has a delivery site $d_i$, a pickup site $p_i$, an optional delivery time window $TW_{di}$ and an optional pickup time window $TW_{pi}$.

A target partition size MaxSize.

Output:

A partition $R=\{M_1 \ldots M_j\}$ of M, each satisfying the following property:

$M_i$ is a model contained in M and independent from the other models in R.

$M_i$ contains at most MaxSize shipments

TimeDecomposition(M):

```
    If (no time window)
        Return M;
    Build L = (shipment, time window) from M
    Sort L by start time window
    Let R = { } an empty list of model
    Let C = { } an empty list of shipment
    For each S = (shipment, time window) in L
        Add S in C
        If (size of C > maxsize)
            Add C to the result list R
            C = { }
    Return R;
```

Auxiliary Function 4: Radial (Spatial) Decomposition

Input:

A set of sites $V=\{v_1 \ldots v_k\}$. Each site $v_i$ has a pair of coordinates (x,y) defining its position, and a site id $ID_{vi}$.

A model $M=\{s_1, \ldots s_N\}$ shipments. Each shipment $s_i$ is has a delivery site $d_i$, a pickup site $p_i$, an optional delivery time window $TW_{di}$ and an optional pickup time window $TW_{pi}$.

A target partition size MaxSize.

Output:

A partition $R=\{M_1 \ldots M_j\}$ of M, each satisfying the following property:

$M_i$ is a model contained in M and independent from the other models in R.

$M_i$ contains at most MaxSize shipments

RadialDecomposition(M):

```
If (M is an inbound model)
        Let P = {all pickups sites of M}
    Else
        P = {all delivery sites of M}
Compute O = (Ox, Oy) , the geometric barycenter of P.
        L = { }
For each site k in P
        Angle = atan2(longitude of k - Ox, latitude of k - Oy) + PI;
        Add (k, Angle) in L
Sort L by angle
Let IL an array of shipment list
For each k=(site s,angle a) in L
        Add s to IL[integer value of a]
Find index I in IL which density is lowest (size of list is smaller)
        R = { }
C = { }
For each j = 0...IL.size
        Append L[(j + I) mod (size of IL)] to C
        If (size of C > maxpointbyset)
            Add C to R
            C = { }
    Return R;
]
```

An automated partitioning system may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A method for automated partitioning of transportation routing problems by a data processing system, comprising:
    determining, by the data processing system, a threshold number of shipments per partition, wherein determining a threshold number of shipments per partition is determined dynamically based on a heuristic function;
    initially dividing, by the data processing system, a routing problem into geographic centers to form a plurality of geographic center routing problems for each of the geographic centers;
    selecting, by the data processing system, a geographic center from the geographic centers;
    mapping, by the data processing system, delivery and/or pickup sites at geographic locations around the geographic center;
    scanning, by the data processing system, radially around the geographic center to determine a sparsest or densest region of the sites and selecting a starting point in this region;
    progressing, by the data processing system responsive to the scanning, from the starting point radially around the geographic center aggregating the sites into partitions with a maximum of the threshold number of shipments in each partition; and
    outputting, for each of the partitions, a set of routes that each comprise a vehicle, a list of shipments for the vehicle, and unload events associated with the vehicle.

2. The method as claimed in claim 1, wherein the geographic center is a location computed geometrically from existing sites.

3. The method as claimed in claim 1, wherein scanning radially around the geographic center to determine the sparsest or densest region of the sites comprises:
    binning, by the data processing system, all the sites into predetermined sized bins according to an angle they form between a selected line and the site location with respect to the geographic center and determining the smallest bin or the largest bin in the predetermined sized bins.

4. The method as claimed in claim 1, further comprising:
    solving, by the data processing system, each geographic center routing problem to generate one or more optimized routes; and
    creating, by the data processing system, a union of all the partitions.

5. The method as claimed in claim 4, further comprising:
    performing, by the data processing system, a local search optimization on the union of all the partitions.

6. The method as claimed in claim 1, further comprising:
    temporally dividing, by the data processing system, each of the plurality of geographic center routing problems for the geographic center that have a number of shipments exceeding the threshold number of shipments per partition.

7. The method as claimed in claim 6, wherein temporally dividing the plurality of geographic center routing problems for the geographic center comprises:
    sorting, by the data processing system, the shipments by ascending pickup or delivery times; and
    grouping, by the data processing system, the shipments in groups of consecutive items.

8. The method as claimed claim 1, further comprising:
    receiving as inputs, by the data processing system, one or more identifiers of pickup or delivery sites, one or more identifiers of geographic centers, one or more vehicle capacity constraints, and one or more temporal constraints;
    calculating, by the data processing system, one or more problem space sizes based on the number of said geographic centers and said one or more vehicle capacity constraints; and
    for each problem space of size greater than a predetermined size:
        partitioning, by the data processing system, said problem space by said number of said geographic centers;
        further creating, by the data processing system, one or more partitions of said problem space according to said one or more temporal constraints;

iteratively creating, by the data processing system, an aggregation of one or more of the pickup or delivery sites within each partition of said problem space until said aggregation reaches said predetermined size for said problem space; and selecting, by the data processing system, one or more vehicle routes according to said aggregation.

9. A data processing system for automated partitioning of transportation routing problems, comprising:

a processor coupled to a memory device having executable program code stored therein, wherein the data processing system comprises:

a threshold constant component that is configured to determine a threshold number of shipments per partition, wherein the threshold constant component includes a dynamic threshold adjusting component that is configured to determine a threshold number of shipments per partition dynamically based on a heuristic function;

a center partitioning component that is configured to initially divide a routing problem into geographic centers to form a plurality of geographic center routing problems for each of the geographic centers;

a center selection component that is configured to select a geographic center from the geographic centers;

a site mapping component that is configured to map delivery and/or pickup sites at geographic locations around the geographic center;

a radially scanning component that is configured to scan radially around the geographic center to determine a sparsest or densest region of the sites and select a starting point in this region;

a site aggregating component that is configured to progress, responsive to the scan, from the starting point radially around the geographic center aggregating the sites into partitions with a maximum of the threshold number of shipments in each partition; and an output component configured to provide to a transportation routing system, for each of the partitions, a set of routes that each comprise a vehicle, a list of shipments for the vehicle, and unload events associated with the vehicle.

10. The data processing system as claimed in claim 9, wherein the radially scanning component is configured to bin all the sites into predetermined sized bins according to an angle they form between a selected line and the site location with respect to the geographic center and determine the smallest bin or the largest bin in the predetermined sized bins.

11. The data processing system as claimed in claim 9, further comprising a transport routing system configured to solve each geographic center routing problem to generate one or more optimized routes and create a union of all the partitions.

12. The data processing system as claimed in claim 11, further comprising a search optimization component configured to perform a local search optimization on the union of all the partitions.

13. The data processing system as claimed in claim 9, further comprising:

a temporal partitioning component configured to temporally divide the plurality of geographic center routing problems for the geographic center that have a number of shipments exceeding the threshold number of shipments per partition.

14. A non-transitory computer readable storage device storing a computer program thereon which, upon execution by a computer, causes the computer to perform steps comprising:

determining a threshold number of shipments per partition, wherein determining a threshold number of shipments per partition is determined dynamically based on a heuristic function;

initially dividing a routing problem into geographic centers to form a plurality of geographic center routing problems for each of the geographic centers;

selecting a geographic center from the geographic centers;

mapping delivery and/or pickup sites at geographic locations around the geographic center;

scanning radially around the geographic center to determine a sparsest or densest region of the sites and selecting a starting point in this region;

responsive to the scanning, progressing from the starting point radially around the geographic center, aggregating the sites into partitions with a maximum of the threshold number of shipments in each partition; and outputting a set of routes, for each of the partitions, that each comprise a vehicle, a list of shipments for the vehicle, and unload events associated with the vehicle.

15. The non-transitory computer readable storage device as claimed in claim 14, wherein scanning radially around the geographic center to determine the sparsest or densest region of the sites comprises:

binning all the sites into predetermined sized bins according to an angle they form between a selected line and the site location with respect to the geographic center, and determining the smallest bin or the largest bin in the predetermined sized bins.

* * * * *